June 3, 1941. W. W. WALDEN 2,244,274
SHOCK ABSORBER
Filed May 8, 1939 3 Sheets-Sheet 1
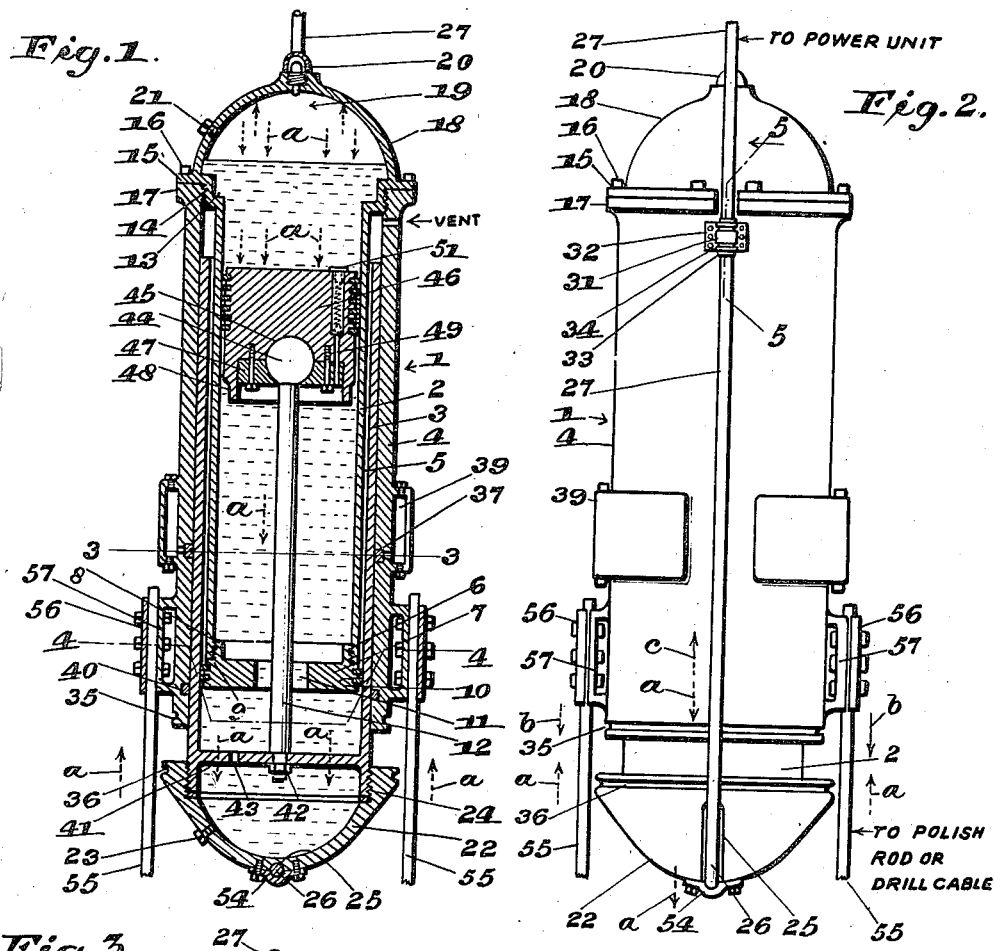
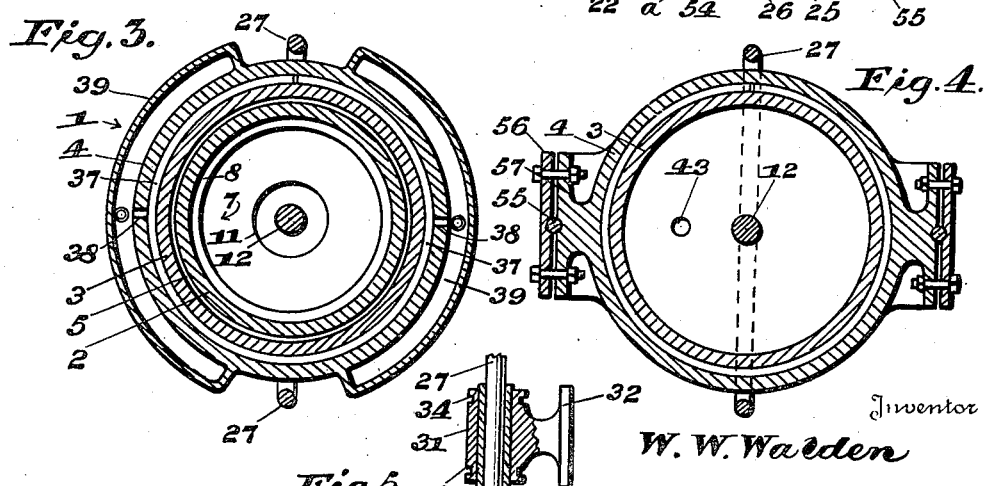
Inventor
W. W. Walden
By Munn, Anderson & Liddy
Attorney

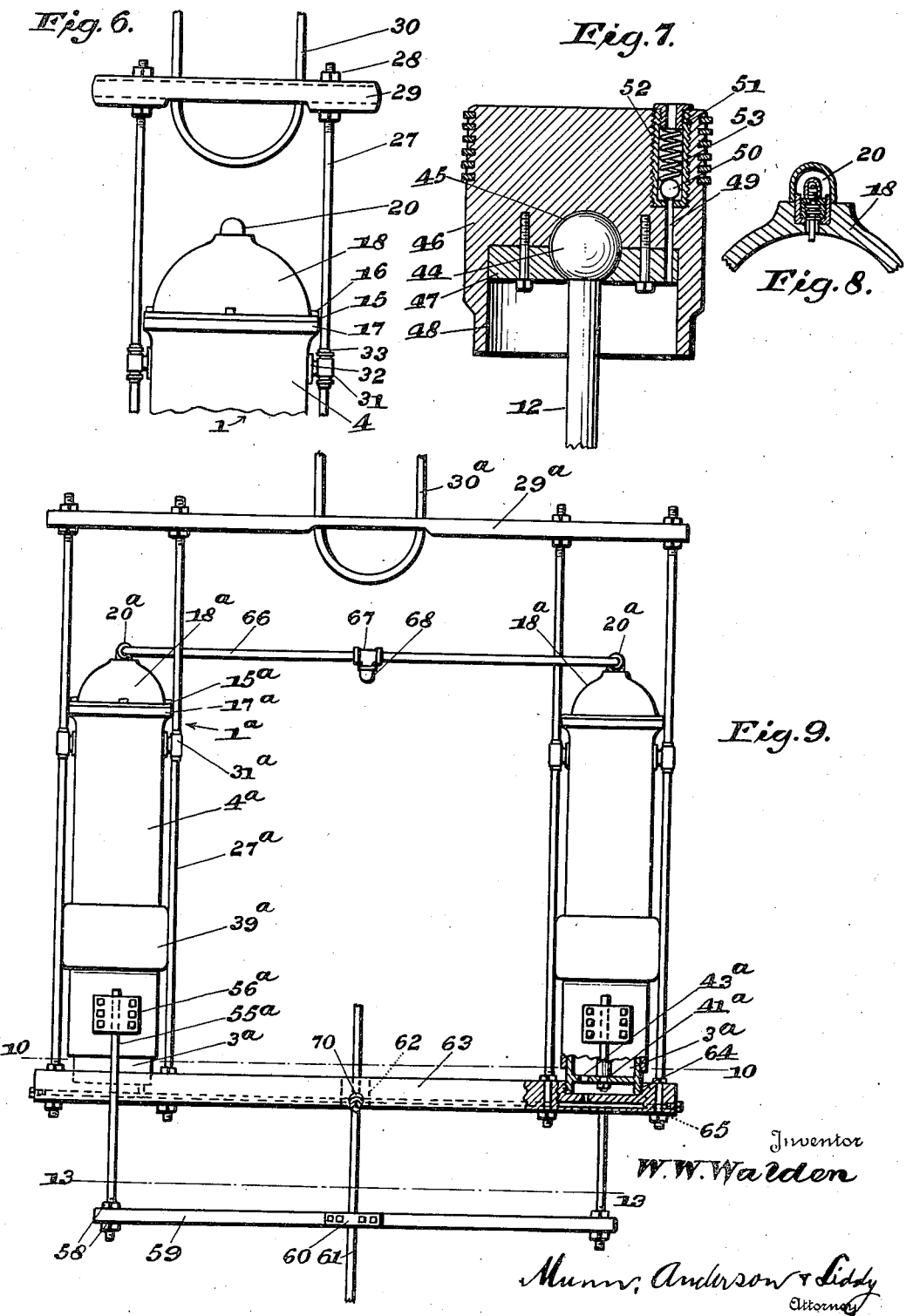

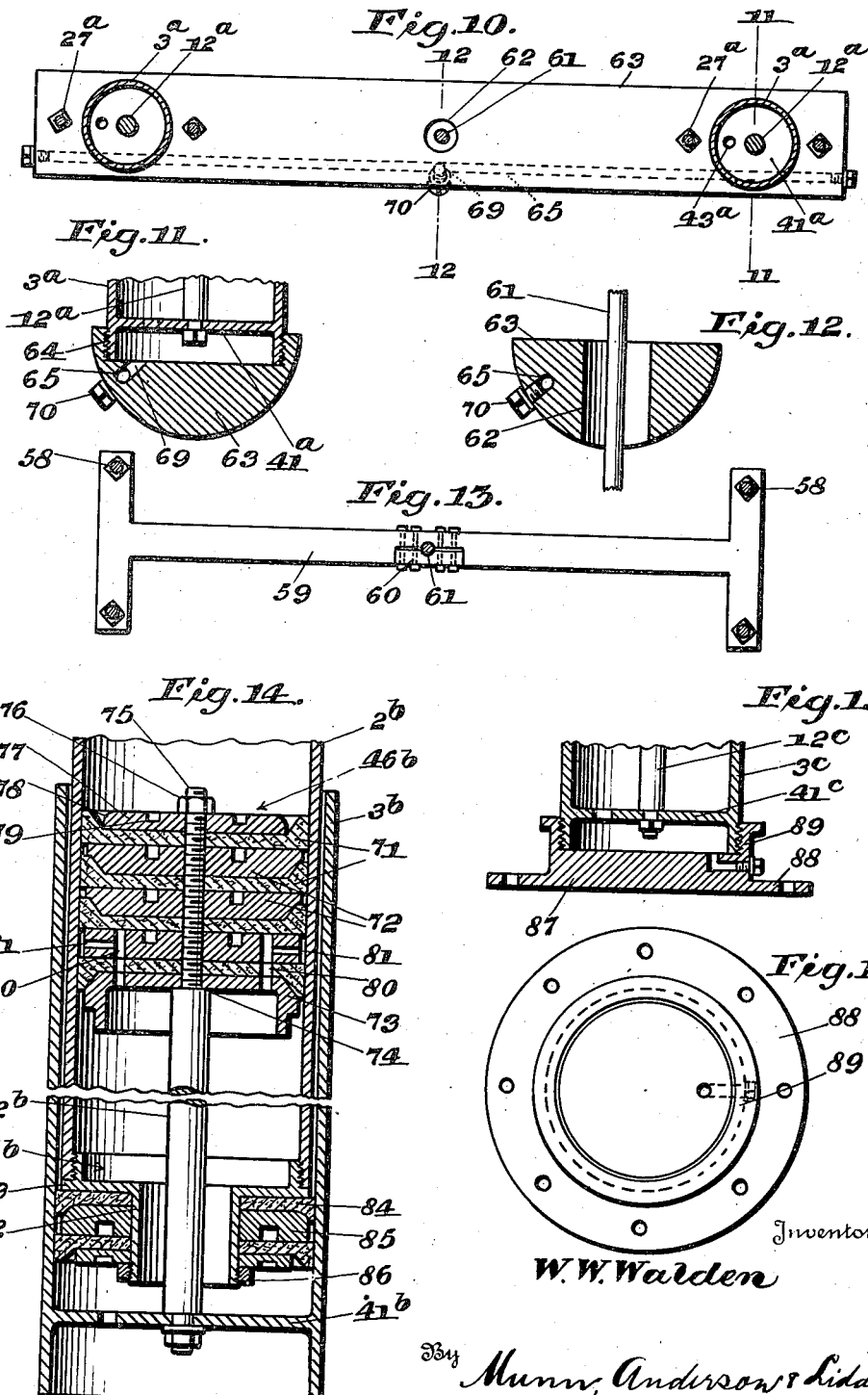

Patented June 3, 1941

2,244,274

UNITED STATES PATENT OFFICE 2,244,274

SHOCK ABSORBER

Willie W. Walden, Hugo, Okla.

Application May 8, 1939, Serial No. 272,527

3 Claims. (Cl. 267—1)

This invention relates to improvements in oil well machinery, being concerned particularly with such apparatuses as drilling and pumping units. These units are subject to extreme shocks due to the heavy duties which they are required to perform, and these shocks are responsible in various ways to an abbreviation of the useful life of the mechanisms. The instant invention provides a remedy for lessening said shocks, in which respect it comprises a shock absorber, the objects of which are as follow:

First, to provide a shock absorber for use in conjunction with an oil well, in which respect it is adapted to either a drilling or pumping unit because its combined pneumatic and hydraulic principles are operable in eliminating shocks incidental to the operation of each of the foregoing types of mechanism.

Second, to provide a shock absorber for a well drilling unit, capable of reducing the peak load, absorbing and rolling out the shock, strain, vibration and dead weight and of keeping the drilling cable taut at all times, thus prolonging the life of the power unit and permitting faster drilling.

Third, to provide a shock absorber for a well pumping unit respecting which it has the principal preceding advantages including keeping the sucker rod taut, thereby stabilizing the pumping stroke and greatly increasing the pumping efficiency.

Fourth, to provide a shock absorber which is readily adaptable to either type of pumping equipment aforesaid, being as easily installed between the drilling cable and power unit of a drilling rig as between the power unit and polish rod of a pumping rig.

Fifth, to provide a shock absorber for the foregoing and analogous purposes comprising two systems fo telescoped cylinders, each with a piston for the respective purposes of producing a compression of air and of preventing the escape of liquid from the interior of the asborber.

Other objects and advantages will appear in the following specification, reference being had to the accompanying drawings, in which:

Figure 1 is a central vertical section of a shock absorber which is adaptable either to a drilling or pumping unit of an oil well, Figure 2 is a side elevation of the shock absorber, Figure 3 is a cross section taken on the line 3—3 of Figure 1, Figure 4 is a cross section taken on the line 4—4 of Fig. 1, Figure 5 is a detail vertical section taken on the line 5—5 of Fig. 2, Figure 6 is a detail side elevation illustrating the means for coupling the shock absorber to a power unit, Figure 7 is a detail sectional view of the upper piston in Fig. 1, Figure 8 is a detail sectional view of the air relief valve, Figure 9 is a partially sectional and elevational view illustrating a modification wherein a plurality of shock absorbers is used in combination, Figure 10 is a horizontal section taken on the line 10—10 of Fig. 9, Figure 11 is a cross sectional view taken on the line 11—11 of Fig. 10, Figure 12 is a cross section taken on the line 12—12 of Fig. 10, Figure 13 is a horizontal section taken on the line 13—13 of Fig. 9, Figure 14 is a condensed sectional view of a modified form of piston arrangement, Figure 15 is a detail sectional view of a bottom head hereinafter referred to, and Figure 16 is a plan view of said head.

Inasmuch as the invention is readily adaptable either to a drilling or pumping unit, the following description can be considered as applying to either, although where the need for specific application occurs the description reads as though the shock absorber is used in conjunction with a pumping unit. In the main form of the invention (Figs. 1 to 8) the shock absorber is generally designated 1. Said absorber comprises a pair of telescoped cylinders 2, 3, the inner one 2 being known as the inside piston cylinder, the outer one 3 of the pair being known as the middle cylinder.

The latter denomination of the cylinder 3 is due to the fact that it is situated intermediately of the cylinder 2 and an outer member or housing 4 which, in effect, comprises another cylinder. The cylinders 2, 3 are rather loosely interfitted, there being a noticeable space 5 between them. The cylinder 2 is internally threaded at 6 at its lower or inner end in order to permit screwing the lower or sealer piston 7 into place.

The screw on the piston 7 which is driven into the threads 6 is cut into the exterior of a flange 8. This flange is in upstanding relationship to the skirt of the piston 7, and since it is set in therefrom, as shown, it defines an annular shoulder 9 with which the edge of the cylinder 2 abuts. The perimeter of the piston 7 has a plurality of ring grooves 10 in which rings of appropriate kinds are fitted to produce an adequate seal.

To the latter end said rings ride the internal wall of the cylinder 3. The piston 7 has a fairly large central hole 11 for the free passage of a piston rod 12. The outer end of the cylinder 2 is annularly enlarged at 13, and this enlargement is externally threaded for screwing into the upper threaded end 14 of the outer housing 4. The enlargement 13 merges into a circular flange 15 which is bolted at 16 to the rim 17 of said outer housing.

A dome 18 surmounts the flange 15. This dome is herein known as the top head. It also plays a part in defining a compression chamber 19. Air is adapted to be compressed into this chamber, and an initial quantity of air is introduced under pressure through an air valve 20, the specific details of which are shown in Fig. 8.

A plug 21 is adapted to be removed from a hole at the top head 18 prior to pumping oil in at a hole in a bottom head 22, said hole normally being closed by the plug 23. Said bottom head comprises the closure for the outer end of the middle cylinder 3. It is also a generally dome-shape, and it is internally threaded at 24 for screwing onto the threaded end of said cylinder. The head 22 is grooved at 25 (Fig. 2) to provide a recess for a hanger yoke 26, the rods 27 of which extend up beside the housing 4, eventually being connected at 28 (Fig. 6) to a cross bar 29 which bridges the distance between said rods.

The cross bar 29 is in the nature of an equalizer. It has a yoke 30 attached to it in a centralized position, and it is this yoke which is suitably suspended from the walking beam (not shown) of the pumping unit with which the instant shock absorber is to be used. The hanger rods 27 are guided by brackets 31 (Fig. 2). Each of these brackets has a flange 32 through which securing means are driven into the housing 4. Each bracket includes a bushing 33 (Fig. 5), and the bracket itself is grooved at 34 near its ends to provide for the securement of dust boots (not shown).

On the same order the housing 4 and bottom head 22 are grooved at 35, 36 for the securement of a dust boot to keep clean the sliding joint between the middle cylinder 3 and housing 4. This joint is lubricated by a felt washer 37 which is seated in the internal wall of the housing 4 (Fig. 1). Oil is supplied to this washer by ducts 38 (Fig. 3) which communicate with oil reservoirs 39 on the outside of the housing. Oil creeping down the joint between the two cylinders is retained by a felt ring 40 situated in a groove in the housing.

The previously mentioned piston rod 12 is carried by a partition 41. This partition is generally integral with the middle cylinder 3 and is located contiguously to its bottom end. The piston rod is suitably secured at 42 in the center of this partition, and it moves through the central hole 11. The partition 41 has a hole 43 for the passage of oil from the interior of the head 22 to the interior of the fluid chamber defined by the piston and end head assemblage. The rigidly upstanding piston rod 12 terminates in a ball head 44 which occupies a socket 45 partly in the upper piston 46 and partly in a lock plate 47 which is secured to the piston in a recess 48.

A hole 49, commonly in the piston 46 and lock plate 47, provides for the conduction of oil to the compression chamber 19 past a ball valve 50 (Fig. 7). This valve is held seated in a cage 51 which is screwed into a counterbore 52. Said valve is held seated by a spring 53.

Reverting to the hanger yoke 26 it is observed in Figs. 1 and 2 that use is made of a clip 54 to hold said yoke in the groove 25. The entire hanger yoke is firmly held between the brackets 31 and the clip 54. The outer housing 4 is coupled to the load by means of a pair of tie rods 55 (Fig. 2), the upper ends of which are clamped at 56 against brackets 57 which stand out from opposite sides of the housing 4. Thus it will be understood that the hanger rods 27 extend in one direction to a power source while the tie rods 55 extend in another direction to the load.

Reference is next made to Fig. 9. The arrangement here shown is intended for use in a particularly heavy installation wherein a single shock absorber unit, as in Figs. 1 and 2, would not be sufficient. All parts agreeing with the structure in Figs. 1 and 2 are identified by corresponding numerals to which the exponent letter a has been added. For example, the outer housing 4a of each shock absorber will be identified by its top head 18a and oil reservoir 39a. The clamps 56a secure the tie rods 55a which are now shown as being secured at 58 to a tie rod bracket 59. This bracket has clamping means 60 for its securement to a polish rod 61.

This polish rod, if of excessive length, is adapted to extend through a hole 62 (Fig. 10) in a head tie bar 63. This tie bar is of heavy construction, and it is recessed at 64 near its ends (Fig. 9) for the affixation of the middle cylinders 3a. The tie bar 63 is thus an equivalent of the bottom head 22 (Fig. 1) to which end it has an oil line 65 by which oil is adapted to be conducted into the ends of the middle cylinders. The latter are partitioned at 41a and provided with holes 43a for the infeeding of the oil as in the previous modification.

A pipe 66 joins the valves 20a to a common T 67. This T has an air valve cap 68, and by removing this cap air is adapted to be pumped into both top heads 2 by the application of a suitable compressor. The cross bar 29a will be recognized as the equivalent of the cross bar 29 in Fig. 6, now being long enough to accommodate the twin shock absorbers.

Figs. 11 and 12 illustrate the cross sectional shape of the tie bar 63. This is half round, as shown, this shape having been found most convenient but not necessarily adhered to in all instances. The oil line 65 has ports 69 which provide communication with the interiors of the respective middle cylinders 3a. Fig. 14 illustrates a modification of the cylinder assemblage. The use of this assemblage is optional, and is here illustrated to show that it can be used instead of the arrangement in Fig. 1 in some cases. The main distinction is that in Fig. 1 the pistons are made of steel whereas in Fig. 14 they are not. Those parts which agree with the first form of the invention are denoted by corresponding numerals supplemented with the exponent letter b.

The inside and middle cylinders 2b, 3b are movable respectively, to each other as before, the latter having a perforated partition 41b which comprises the anchorage for the piston rod 12b. The inner piston, generally designated 46b comprises an assemblage of cup leathers 71 and interspersed metal supports 72. This assemblage is supported by a bottom member 73 which is mounted on a shoulder 74 formed by a reduced spindle 75 which goes through the foregoing assemblage. The latter is clamped together by a nut 76 which is screwed down on the spindle and against a top washer 77. Said washer has a beveled edge 78 which avoids injury to the adjacent cup leather when the margin of the latter is flexed.

The foregoing spindle is threaded. The various supports 72 are screwed down on the threaded spindle, and successively and individually hold the interposed cup leathers under compression. To attain this purpose the supports have spanner wrench holes 79. At least one of the pairs of supports and the interposed cup leather, for example, the bottom member 73 and the cup leather and support next highest, have oil holes 80 from which ducts 81 extend laterally in the support next lowest, to the space at the periphery of said support, thus to supply the piston 46b with oil.

The lower sealer piston 7b is constructed on a similar principle, the former central hole 11 (Fig. 1) now being substituted for by a collar 82 which depends from the piston plate 83. The cup leathers and metal supports 84, 85 are assembled on this collar, and a nut 86 is screwed onto the end of the latter to clamp the assemblage tightly.

Figs. 15 and 16 illustrate a means for adapting the shock absorber to the top of a walking beam, rather than to suspend the shock absorber therefrom as proposed in Figs. 1 and 2. In Fig. 15 the bottom head 87, which is to be regarded as the equivalent of the bottom head 22 (Fig. 1), is flanged at 88 for securement to the top of a walking beam as stated. The middle cylinder, now designed 3c, is screwed into the upstanding collar 89. The middle cylinder has a partition 41c as before, and this carries the rod 12c of an upper piston (not shown) which is to be regarded as identical with either of the upper pistons in Figs. 1 and 14. Otherwise, the shock absorber unit partly shown in Fig. 15 functions the same as the others.

The operation is readily understood. In Fig. 1 oil is pumped into the internal fluid chamber of the shock absorber by removing the oil plug 23 and pumping the oil through the hole. The plug 21 is removed from the top head 18, and the pumping in of oil stops when oil starts to run out of the latter plug hole. The oil reaches the compression chamber 19 by passing through the valve cage 51 (Figs. 1 and 7). The plugs 21, 23 are then replaced and air is pumped in through the valve 20 until there is enough pressure in the chamber 19 to force the bottom head 22 three or four inches from the outer casing 4.

The directions of movement under the influence of the foregoing internal pressure is designated by the dotted arrows a in Figs. 1 and 2. In other words, the air pressure in the chamber 19 (Fig. 1) tends to drive the liquid down, and since the latter abuts the upper piston 46 the result is a motion of the cylinder systems in opposite directions. The shock absorber is now ready for mounting on the pumping unit. It is suspended from the walking beam by the hanger rods 27 and coupled with the polish rod by the tie rods 55.

The weight of the polish rod pulls downward on the outer housing 4 in the direction of the arrows b (Fig. 2). The pull on the hanger rods 27 by force of an upstroke of the walking beam is designated by the arrow c (Fig. 2). When the walking beam makes an upstroke the middle cylinder 3 is forced upwardly or inwardly of the assemblage, thus increasing the compression of the air in the chamber 19.

When the power unit now makes a down stroke the middle cylinder 3 is forced downwardly by the released force of the added compression against the piston 46. The compressed air tends to kick the piston 46 downwardly and thus take out all slack in the working line. The compression of the air in the upper chamber by the operation of the piston 46 reduces the peak load and forms a cushion in the manner already brought out.

The lower piston 7 performs a similar function, but its main purpose is to act as a sealer. It rides against the internal wall of the cylinder 3 and prevents the escape of the oil from the fluid chamber.

I claim:

1. A shock absorber comprising a head, a pair of annularly-spaced cylinders depending therefrom, the outer cylinder providing a housing, a middle cylinder working in the annular space, said cylinder having a head, a partition across the middle cylinder adjacent to its head, a rod affixed to said partition and extending inwardly of the cylinder assemblage, a piston on the inner end of said rod, riding the adjacent wall of the inner cylinder and having a socket, a ball on the inner end of said rod occupying the socket and providing for the adaptation of the respective piston to the adjacent cylinder, a piston on the inner end of said adjacent and inner cylinder, riding the wall of the middle cylinder and having a hole for the piston rod, a valve in the piston on said rod providing for the passage of a volume of liquid contained by the piston assemblage, brackets on the housing cylinder having tie rods affixed thereto, a hanger yoke embracing the cylinder assemblage and having means attaching it to the head of the middle cylinder, and guide means on said housing holding the hanger yoke in line with said housing.

2. In a shock absorber for well pumping apparatus and the like, an interfitted cylinder assemblage headed at the outer ends to define an internal fluid chamber, the interfitted cylinders having interengaged pistons, the head of one of the cylinders being grooved, a hanger yoke emplaced in the groove and having rods extending beside the cylinder assemblage, guide means carried by the other cylinder, slidably containing said rods, brackets carried by said other cylinder, and the rods secured to said brackets, said hanger yoke and tie rods thus being coupled to the respective cylinders.

3. In a shock absorber for well pumping apparatus and the like, a pair of interfitted cylinder assemblages, each including an inner cylinder and an outer housing, a head on each of the outer housings, a head tie bar having the inner cylinders commonly connected thereto, said tie bar having a fluid line with ports entering the inner cylinders and providing common fluid connection therebetween, hanger means fixedly attached to the tie bar, a cross bar coupling the hanger means and in turn having means for its connection to a power source, tie rods affixed to the outer housings, and a bracket commonly connecting said tie rods and having means for its attachment to a polish rod.

WILLIE W. WALDEN.